United States Patent [19]

Yoshioka et al.

[11] Patent Number: 4,743,977
[45] Date of Patent: May 10, 1988

[54] VTR HAVING MAGNETIC-HEAD ARRAY CAPABLE OF RECORDING/REPRODUCING SIGNALS OF A PLURALITY OF RECORDING SYSTEMS

[75] Inventors: Atsushi Yoshioka, Katsuta; Kuniaki Miura, Ibaraki; Kazunori Kotani; Michio Masuda, both of Katsuta; Yasufumi Yumde; Takao Aria, both of Yokohama, all of Japan

[73] Assignee: Hitachi, Ltd., Tokyo, Japan

[21] Appl. No.: 901,803

[22] Filed: Aug. 29, 1986

[30] Foreign Application Priority Data

Sep. 2, 1985 [JP]  Japan ................................ 60-191902

[51] Int. Cl.⁴ ...................... H04N 9/80; H04N 5/782; G11B 5/02
[52] U.S. Cl. .................................... 358/310; 358/343; 360/18; 360/19.1
[58] Field of Search ............... 358/310, 330, 335, 341, 358/343; 360/18-21, 64, 61

[56] References Cited

U.S. PATENT DOCUMENTS

| | | | |
|---|---|---|---|
| 4,376,957 | 3/1983 | Dischert et al. | 358/310 X |
| 4,591,924 | 5/1986 | Muira et al. | 358/330 |
| 4,672,467 | 6/1987 | Heitmann | 358/310 X |

Primary Examiner—W. B. Perkey
Attorney, Agent, or Firm—Antonelli, Terry & Wands

[57] ABSTRACT

Disclosed is a VTR of the helical scan type having a plurality of rotary magnetic heads. This VTR can select one of a first and a second signal recording forms which are different from each other, and record signals on a magnetic tape. In the first recording form, a frequency-modulated video signal including a luminance signal and a color signal and a frequency-modulated sound signal are recorded on the same track so as to be superimposed one on the other. In the second signal recording form, a frequency-modulated luminance signal and a frequency-modulated color signal are recorded separately on tracks adjacent to each other. This VTR has compatibility with respect to the recording/reproducing of two different signals.

10 Claims, 6 Drawing Sheets

VTR HAVING MAGNETIC-HEAD ARRAY CAPABLE OF RECORDING/REPRODUCING SIGNALS OF A PLURALITY OF RECORDING SYSTEMS

BACKGROUND OF THE INVENTION

The present invention relates to a magnetic recording/reproducing apparatus of the helical scan type such as a video tape recorder (a VTR), a video cassette recorder (a VCR), or the like.

Color television signals encoded in a standard NTSC manner or in a standard PAL manner include luminance components and chrominance components quadrature-modulated into a color subcarrier. When these signals are recorded on a magnetic tape by a magnetic recording/reproducing apparatus, generally, a "color under" system is used.

In this system, the color subcarrier, quadrature modulated with chroma components, is directly recorded at a low frequency on the same tape track with an FM carrier modulated by video luminance information. To improve linearity, the directly recorded chrominance information is recorded with the aid of a bias signal. To prevent interaction between the bias signal and the frequency-modulated carrier, the FM carrier is often used as the bias signal.

In a "VHS" system known as a "VTR" system for home use, the frequency of a subcarrier of recorded chrominance information is selected to be 0.629 MHz, and the frequency of an FM carrier is, on the other hand, selected to be 3.4 MHz–4.4 MHz.

While such an arrangement allows recording of a color television signal on a single track of a video tape recorder, certain problems exist, such as poor SN of the chrominance signal, crosstalk between the two quadrature-modulated color signals, and limited frequency bandwidth which necessitates reduction of the desired bandwidth in either the chrominance or luminance information, or possibly both. Furthermore, the FM luminance carrier cannot be modulated to the maximum possible amount because maximum modulation drives the recording medium into saturation, adding distortion to the directly recorded chrominance information.

In order to improve the quality of the television signal to broadcast standards, the luminance information may be recorded on a first track of the tape by the use of a frequency-modulated carrier, while at the same time recording the chrominance information onto a second track of the tape adjacent the first. The chrominance information is modulated onto a frequency-modulated carrier for improved signal-to-noise.

The "two-channel" VTR of the type as described above is disclosed, for example, in U.S. Pat. No. 4,376,957.

It is a matter of course that the information recorded in the foregoing VTR of the "VHS" system is different in format from the information recorded in the foregoing "two-channel" VTR. Therefore, the conventionally known VTR of the "VHS" system cannot reproduce information signals recorded by the "two-channel" VTR, while the "two-channel" VTR cannot reproduce information signals recorded by the VTR of the "VHS" system.

Generally, the VTR of the "VHS" system is provided with two operation modes, one being called an "SP" mode and the other an "EP" mode. In the "SP" mode, a magnetic tape is fed at a speed of about 33 mm/sec, and a pitch of a recording tack is selected to be 58 μm. In the "EP" mode, on the other hand, a magnetic tape is fed at a speed of about 11 mm/sec, and a pitch of a recording track is selected to be 19 μm. The "EP" mode is also called a "triple" mode. In the helical scan type VTR generally provided with two rotary magnetic heads being different in azimuth angle from each other and being disposed on a rotary head drum separately from each other by an angle of 180 degrees, a video signal for one frame, that is, two fields, is recorded on a magnetic tape by the two heads alternately for the respective fields one by one. The foregoing VTR of the "VHS" system is provided with two video heads for the "SP" mode and two video heads for the "EP" mode. Further, known is a VTR of the "VHS" system provided with two rotary sound heads in addition to the four video heads. A frequency-modulated sound signal is recorded by these sound heads onto a track having the same inclination as a track on which a video signal is to be recorded, that is, the video signal is written in a tape so as to be superimposed on the sound signal. The sound signal is recorded in a deep position of the tape while the video signal is recorded in a shallow position of the same. The two sound heads are different in azimuth angle from each other, and further the respective azimuth angles of the two sound heads are different from those of the video heads. The width of a track on which a sound signal is recorded is selected to be about 20-25 μm. Thus, the number of magnetic heads is six in the VTR of the "VHS" system having rotary sound heads.

In the "VHS" system, a frequency-modulated sound signal to be recorded in a deep portion and a video signal to be written so as to be superimposed on the former are required to satisfy the following conditions. These conditions are determined so as to reduce a crosstalk as well as a timing error between the video and sound signals.

That is, in the "SP" mode, the video and sound signals are recorded with azimuth angles in the opposite direction to each other and a time deviation of the video signal from the sound signal is selected to be within two fields. In the "EP" mode on the other hand, the video and sound signals are recorded with azimuth angles in the same direction with each other, and the time deviation therebetween is selected to be within a range from 1⅓–3⅓ fields.

Such a "VHS" system as described above is disclosed in detail, for example, in U.S. Pat. No. 4,591,924.

Recently, an apparatus capable of recording/reproducing video signals of both the "color under" system and the "two-channel" system has been required. If the VTR of the "two-channel" system is incorporated in the VTR of the "color under" system, the foregoing apparatus may be realized. However, if both the VTRs are assembled merely integrally with each other, many magnetic heads must be required because it is necessary to provide two pairs of magnetic heads in the "two-channel" VTR.

Further, no compatibility exists between the "two-channel" VTR and the VTR of the "VHS" system. Further, either in the "SP" mode or in "EP" mode, no compatibility exists between both the VTRs.

SUMMARY OF THE INVENTION

An object of the present invention is to provide a magnetic recording/reproducing apparatus capable of recording/reproducing information signals of both the "color under" system and the information recording system having two recording channels, that is, a chrominance channel and a luminance channel.

Another object of the present invention is to provide a VTR of the "VHS" system provided with two heads for an "SP" mode, two heads for an "EP" mode, and two heads for sound signals, in which these heads are suitably arranged and used to thereby make it possible to record/reproduce signals of a "two-channel" VTR.

In the case where, for example, two pairs of heads ($A_1$, $A_2$) and ($B_1$, $B_2$) are disposed on a rotary head drum of a VTR, the heads $A_1$ and $B_1$ being disposed separately from the head $A_2$ and $B_2$ by 180 degrees ($\pi$ rad) respectively, the heads ($A_1$, $A_2$) being located at a position different in height from that of the heads ($B_1$, $B_2$), respective positions of record patterns of magnetic tracks, which are formed on a magnetic tape by the heads ($A_1$, $A_2$) and ($B_1$, $B_2$), vary depending on a running speed of the magnetic tape. At a certain running speed $PV_1$ of the tape, two record patterns formed by the heads $A_1$ and $B_1$ (or by the heads $A_2$, and $B_2$) are superimposed one on the other, and at a running speed $PV_2$ different from the former $PV_1$, two record patterns formed by the heads $A_1$ and $B_2$ (or by the heads $A_2$ and $B_1$) are disposed adjacently to each other. If respective azimuth angles of head gaps of the heads $A_1$ and $B_1$ (or the heads $A_2$ and $B_2$) are different from each other, two signals recorded on the record patterns so as to be superimposed one on the other are correctly reproduced repsectively.

When the two record patterns formed by the heads $A_1$ and $B_1$ (or by the heads $A_2$ and $B_2$) are superimposed one on the other, the head $A_1$ (or head $A_2$) can record video signals of the "color under" system, and on the other hand the head $B_1$ (or the head $B_2$) can record sound signals of the same. When the two record patterns formed by the heads $A_1$ and $B_2$ (or by the heads $A_2$ and $B_1$) are disposed adjacently to each other, the head $A_1$ (or the head $A_2$) can record luminance signals of the "two-channel" system on a first track, and on the other hand the head $B_1$ (or the head $B_2$) can record chrominance signals of the same on a second track disposed adjacently to the first one.

In the recording/reproducing apparatus according to the present invention, positions and tape running speeds of a plurality of heads are suitably selected so as to use these heads for recording/reproducing signals of both the "color under" system and the "two-channel" system.

The present invention will be apparent from the following detailed description taken in conjunction with the accompanying drawings.

DESCRIPTION OF THE PREFERRED EMBODIMENTS

Figure 1:
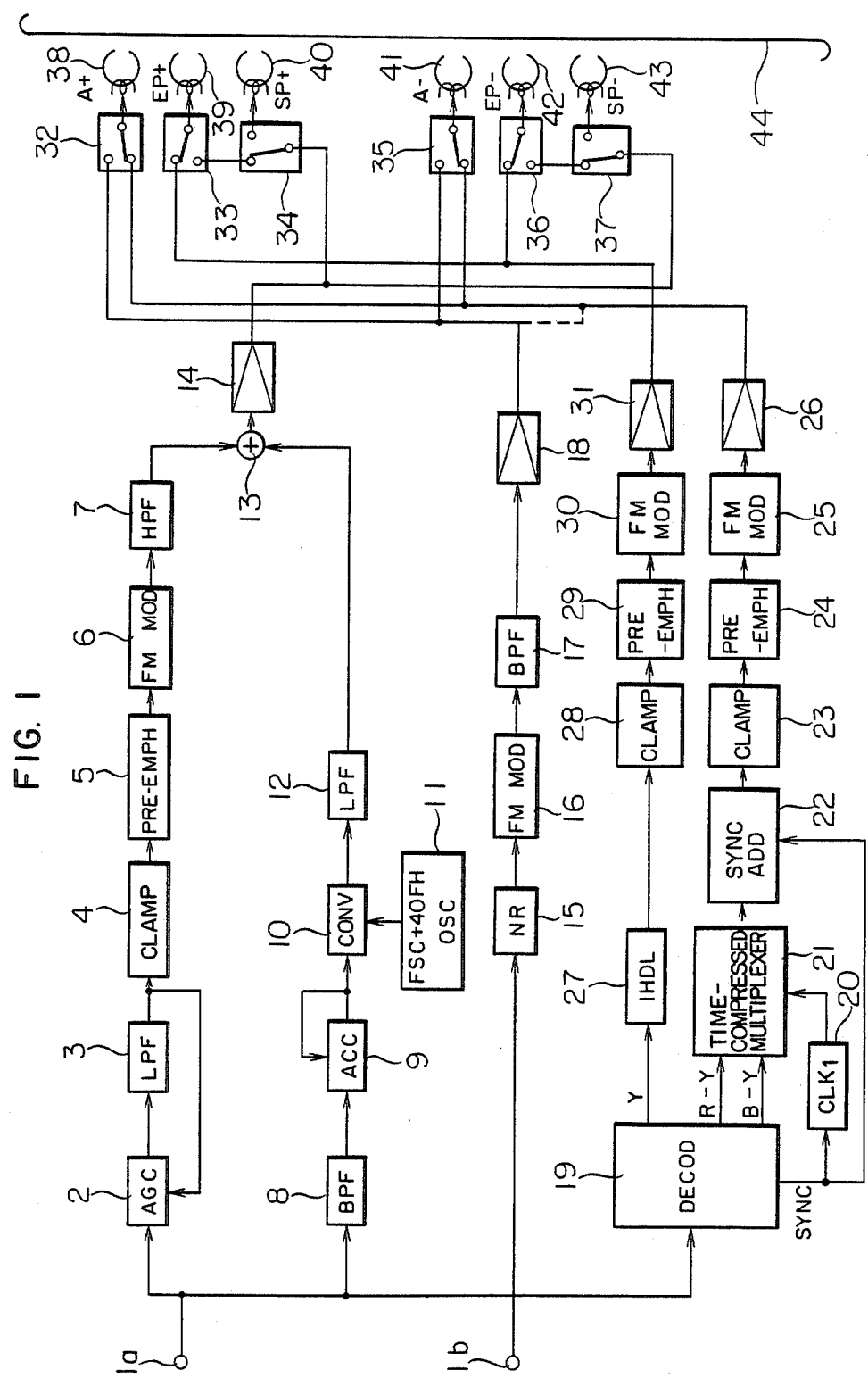
FIG. 1 is a block diagram showing the magnetic recording/reproducing apparatus according to the present invention.

First, referring to FIG. 1, description will be made as to a signal recording circuit in the "color under" system.

An input video signal applied to an input terminal 1a is restricted to have a predetermined amplitude by an automatic gain control (AGC) circuit 2, and passed through a low pass filter (LPF) 3 so as to eliminate a chrominance signal. Then, a synchronizing bottom level of a luminance signal is clamped at a predetermined voltage value by a clamping unit 4, and the luminance signal is emphasized at a frequency portion in a high band by a pre-emphasis circuit 5. Thereafter, the thus obtained luminance signal is frequency-modulated by an FM modulator 6. The frequency-modulated luminance signal is passed through a high pass filter (HPF) 7 so as to eliminate a low frequency component, and then applied to an adder 13. The input video signal applied to the input terminal 1a, on the other hand, is applied to a band pass filter (BPF) 8 so as to take out a chromaticity signal, and restricted so as to make a burst level thereof be a predetermined amplitude by an automatic color control (ACC) circuit 9. Thereafter, the obtained chromaticity signal is converted by a low band conversion circuit 10 into a signal having a frequency in a low band by an output signal from a conversion sub-carrier oscillator 11, passed through a low pass filter (LPF) 12 so as to eliminate a high frequency component, and applied to the adder 13 so as to be added to the frequency-modulated luminance signal. The sum signal is amplified by an amplifier 14, and applied through recording time-mode change-over switches 34 and 37 to a head SP+ 40 and a head SP− 43 respectively or to a head EP+ 39 and a head EP− 42 respectively so as to be recorded on a magnetic tape 44.

A sound signal applied to an input terminal 1b, on the other hand, is frequency-modulated by an FM modulator 16 through a high-frequency emphasis circuit 15 for improving an SN ratio, and the thus obtained FM modulated signal is passed through a BPF 17 so as to eliminate an unnecessary signal component. Thereafter, the output of the BPF 17 is amplified by an amplifier 18 and recorded in a deep position of the magnetic tape 44 through a head A+ 38 and a head A− 41.

Figure 2:
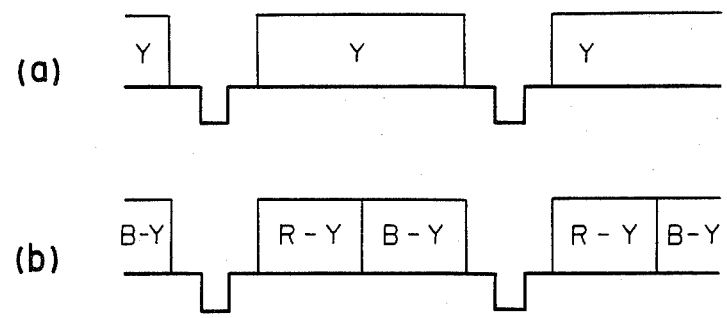
FIG. 2 are typical diagrams showing a luminance signal Y and chrominance signals (R−Y) and (B−Y) in the "two-channel" system.

In the case where a signal is recorded is recorded on the magentic tape 44 in the "two-channel" system, an input video signal applied to the input terminal 1a is separated into a luminance signal Y, color difference signals (R−Y) and (B−Y), and a horizontal synchronizing signal (SYNC) by an NTSC decoder 19. The color difference signals (R−Y) and (B−Y) are formed into a time division multiplex signal in a time-compressed multiplex circuit 21 by using a clock signal $CLK_1$ generated by a clock generation circuit 20, and added with a synchronizing signal for YC timing described later in a synchronism adding circuit 22, the clock signal from the clock generation circuit 20 being synchronized with the horizontal synchronizing signal (SYNC). The luminance signal Y, on the other hand, is passed through a 1 H delay line 27 for correcting a time delay of 1 H in a horizontal period due to the compression f the color difference signal. FIG. 2(a) shows the luminance signal Y appearing as an output of the 1 H delay line 27, and on the other hand, FIG. 2(b) shows the color difference sigals (R−Y) and (B−Y) appearing as an output of the synchronism adding circuit 22. Thereafter, the luminance and color difference signals are passed through clamping circuits 28 and 23, pre-emphasis circuits 29 and 24, FM-modulators 30 and 25, and recording amplifiers 31 and 26 respectively. The thus obtain frequency-modulated luminance is recorded on the magnetic tape 44 through the head EP+ 39 and the head EP− 42, and the frequency-modulated color difference signals are recorded on the magnetic tape through the head A+ 38 and the head A− 41. It is a matter of course that the luminance and the color difference signals are recorded on tracks of the magnetic tape 44 different from each other.

The sound signal is added, for example, to an output signal of the amplifier 18 or to the recording amplifier 26, and frequency-multiplexed on the frequency-modulated color difference signals.

The switches 32, 33, 35, and 36 are changed over between two positions where signals are recorded on the magnetic tape 44 in the "color under" system and in the "two-channel" system respectively. FIG. 1 illustrates the case where the switches 32, 33, 35, and 36 are changed over to the position for performing signal recording in the "two-channel" system.

The switches 34 and 37 are changed over between two positions for the "SP" mode and the "EP" mode, respectively, and FIG. 1 illustrates the case where the switches 34 and 37 are changed over to the position for the "EP" mode.

Figure 3:
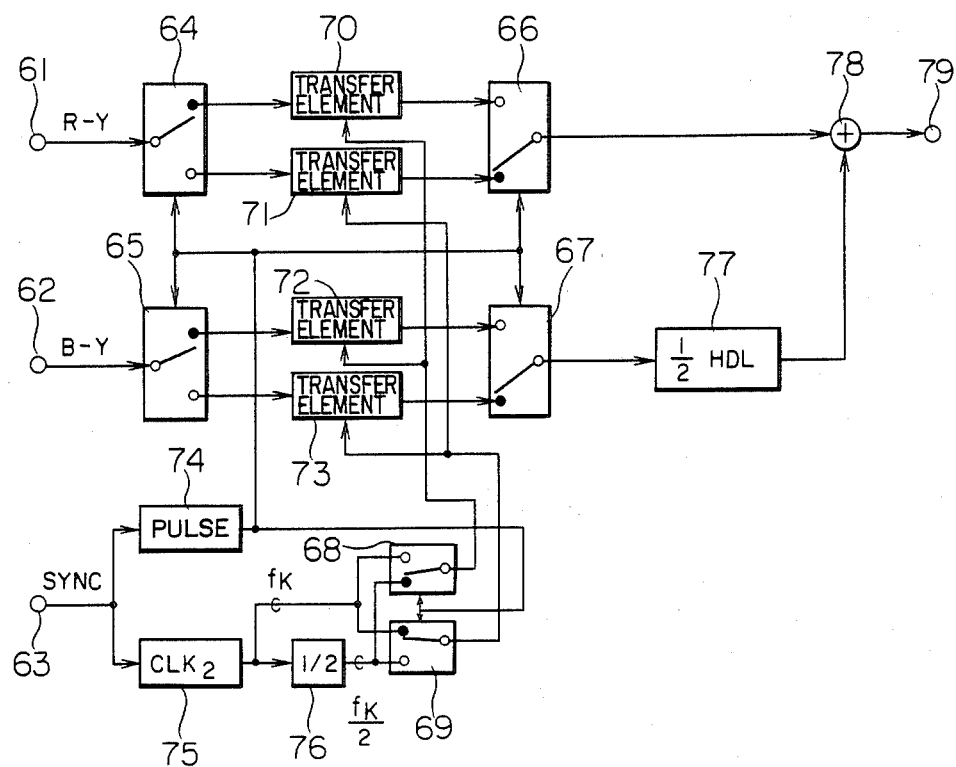
FIG. 3 is a block diagram showing the time-compressed multi-plexing circuit of FIG. 1.

Next, referring to FIG. 3, description will be made as to a more specific embodiment of the time-compressed multiplex circuit 21 shown in FIG. 1.

Color difference signals (R−Y) and (B−Y), and a horizontal synchronizing signal SYNC are applied to input terminals 61, 62, and 63 respectively. A pulse generation circuit 74 generates a pulse having a polarity which is changed every horizontal period (1 H) on the basis of the horizontal synchronizing signal SYNC to thereby simultaneously change over switches 64 through 69 every horizontal period (1 H). At a certain point in time $t_1$, all the switches 64 through 69 are connected in the positions as illustrated in FIG. 3, while at another point in time $t_2$, they are connected in the reversed positions altogether. A clock generation circuit 75, on the other hand, generates a clock signal $CLK_2$ having a frequency of fK and being phase-synchronized with the horizontal synchronizing signal (SYNC). The frequency of this clock signal $CLK_2$ is divided by a ½ divider 76. Upon reception of the clock signal having a frequency of fK/2, transfer elements 70 through 73, which may be changed coupled devices (CCD) or the like, transfer signals with the timing of one horizontal period (1 H). The pair of transfer elements 70 and 71 and the pair of transfer elements 72 and 73 are alternately used. After stored in the transfer element 70 or 71 exactly for one horizontal period in response to a clock signal of the frequency fK/2, the color difference signal (R−Y) is read out is response to a clock signal of the frequency fK with time base compressed into ½. Similarly to this, after processed in the transfer element 72 or 73, the color difference signal (B−Y) is applied to an adder 78 through a ½ H delay line 77 so as to be added to the foregoing color difference signal (R−Y). Thus, the color difference signals which have been multiplexed in time base, as shown in FIG. 2(b), is obtained at an output terminal 79.

Figure 4:
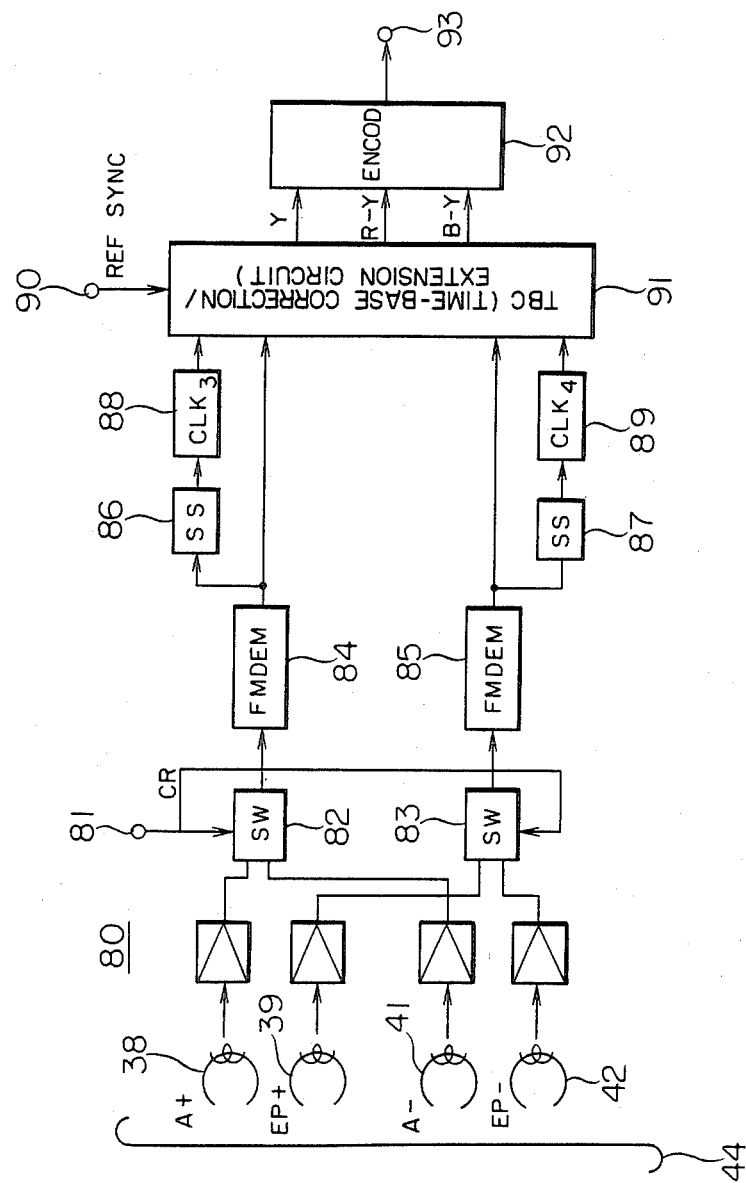
FIG. 4 is a block diagram showing the circuit for reproducing signals recorded on a magnetic tape in the "two-channel" system.

Referring to FIG. 4, a circuit for reproducing luminance and color difference signals recorded in the "two-channel" system will be described hereunder.

The signal recorded on the magnetic tape 44 is reproduced by the pair of heads 38 and 41, or pair of heads 39 and 42, and applied to switch 82 or 83, respectively, through corresponding reproducing amplifiers 80. The switches 82 and 83 convert the time-division signals applied from the recording amplifiers 80 into a continuous signal by a cylinder rotary phase signal CR applied through a terminal 81. The frequency-modulated luminance signal appears at the output of the switch 83 while the frequency-modulated color difference signals appear at the output of the switch 82. The luminance and color difference signals are demodulated by FM-demodulators 84 and 85 respectively and applied to a time-base correction and extension circuit (TBC) 91. Further, respective clock signals $CLK_3$ and $CLK_4$ which are phase-synchronized with reproducing horizontal synchronizing signals separated by synchronizing separator circuits 86 and 87 are generated by clock generation circuits 88 and 89. The time-base correction and extension circuit 91 performs time-base correction (jitter elimination) for the luminance and color difference signals by using the clock signals $CLK_3$ and $CLK_4$ and a reference synchronizing signal applied through a terminal 90 so as to eliminate a difference in time between the luminance and color difference signals, and then performs time-base extension of the color difference signals to thereby separate the color difference signals (R−Y) and (B−Y) from each other. Thereafter, a composite video signal is composed of the luminance signal and the color difference signals (R−Y) and (B−Y) by an NTSC encoder 92 and produced to an output terminal 93.

For example, the color difference signals (R−Y) and (B−Y) may be an I signal and a Q signal respectively, or may be signals formed by frequency-modulating and frequency-multiplexing the two color difference signals. Alternatively, the two color difference signals may be line sequential signals. The video signal, on the other hand, may be that of the standard NTSC, PAL, SECAM, or MAC system.

Figure 5:
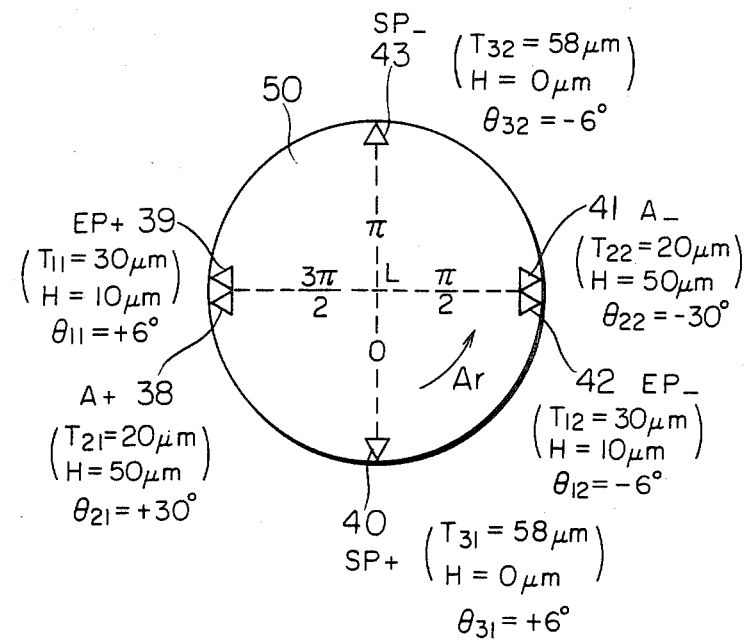
FIG. 5 is a typical plan view showing the arrangement of the rotary heads of the magnetic recording/reproducing apparatus according to the present invention.
Figure 6:
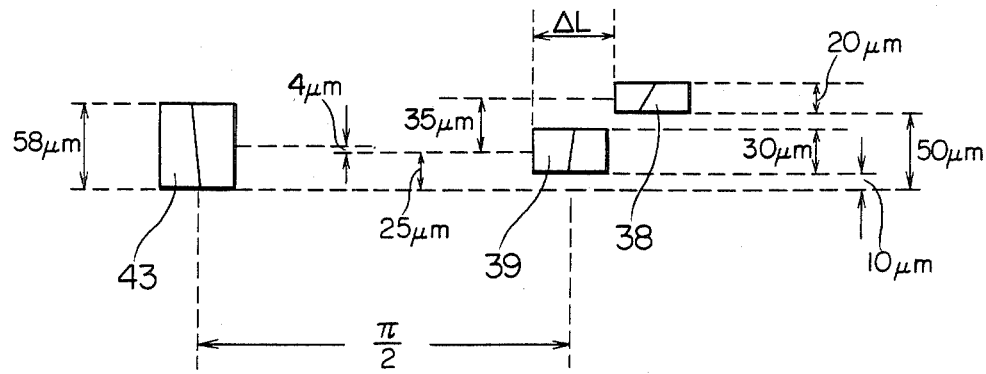
FIG. 6 is a typical plan view showing the rotary heads of FIG. 5 and showing the height when they are arranged.

Referring to FIGS. 5 and 6, description will be made as to the relationship among the relative attachment positions of a plurality of heads, required to realize the present invention.

As shown in FIGS. 5 and 6, a rotary head cylinder 50 is provided with a first pair of magnetic heads EP+ 39 and EP− 42 and a second pair of magnetic heads A+ 38 and A− 41, and if necessary a third pair of magnetic heads SP+ 40 and SP− 43. A track width $T_{11}$ and an azimuth angle $\theta_{11}$ of the head EP+ 39 are selected to be 30 μm and +6 degrees, respectively. A track width $T_{12}$ and an azimuth angle $\theta_{12}$ of the head EP− 42 are selected to be 30 μm and −6 degrees, respectively. A track width $T_{21}$ and an azimuth angle $\theta_{21}$ of the head A+ 38 are selected to be 20 μm and +30 degrees, respectively. A track width $T_{22}$ and an azimuth angle $\theta_{22}$ of the head A− 41 are selected to be 20 μm and −30 degrees, respectively. A track width $T_{31}$ and an azimuth angle $\theta_{31}$ of the head SP+ 40 are selected to be 58 μm and +6 degrees, respectively. A track width $T_{32}$ and an azimuth angle $\theta_{32}$ of the head SP− 43 are selected to be 58 μm and −6 degrees, respectively. The head EP+ 39 and the head A+ head 38 are adjacently closely disposed to each other, and also the head EP− 42 and the head A− 41 are adjacently closely disposed to each other. In FIG. 6, a distance L between the heads 39 and 38 is illustrated exaggeratingly widely. The head EP+ 39 and the head EP− 42 are disposed at positions lower than those of the head SP+ 40 and the head SP− 43 by 4 μm, respectively. The head A+ 38 and the head A− 41 are disposed at positions higher than those of the head EP+ 39 and the head EP− 42 by 35 μm, respectively. The head SP+ 40 and the head SP− 43 are disposed in opposition to each other, that is, separated from each other by an angle of 180 degrees ($\pi$ rad), and the head EP+ 39 and the head A+ 38 are disposed in opposition to the head EP− 42 and the head A− 41, that is, separated from each other by an angle of 180 degrees ($\pi$ rad). The head SP+ 40 is disposed separately from the head EP− 42 by an angle of 90 degrees ($\pi/2$ rad). The rotary head drum 50 rotates in the direction of an arrow Ar in FIG. 5. A magnetic tape (not shown) is wound around the drum 50 and made to run in the direction of the arrow Ar at a low speed.

Figure 7A:
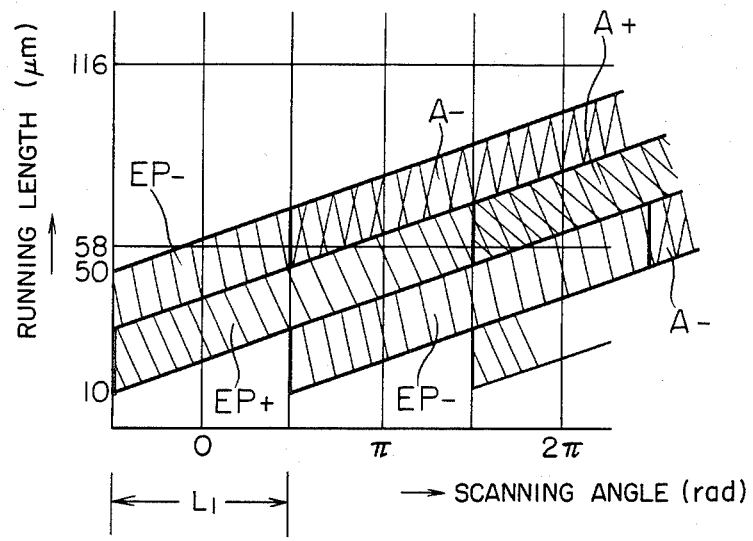
FIGS. 7a, 7b, 7c are typical diagrams showing normalized patterns of the magnetic tracks, formed by the magnetic heads of FIGS. 5 and 6.

FIG. 7a shows record patterns EP+ and EP− of a video signal formed on a tape by the head EP+ 39 and the head EP− 42 respectively as well as record patterns A+ and Aof a sound signal formed on the tape by the head A+ 38 and the head A4l respectively, in a first mode, for example, in the "EP" mode, in the "color under" system In FIG. 7a, the abscissa represents a running distance of the tape normalized by a scanning angle (rad) of the magnetic head, while the ordinate represents a running length (moving distance) of the magnetic head in the direction of height. As the running angle varies by 1 rad, the magnetic tape moves by a distance of $L_1$. While the magnetic head EP+ 39 rotates by 2 rad, the magnetic tape moves by a distance of $2 \times L_1$, so that the record pattern EP+ is superimposed on the record pattern A+. The same relation as described above applied to the record pattern EP− formed by the magnetic head EP− 42 and the record pattern A− formed by the magnetic head A− 41. An azimuth angle of the record pattern EP− is greatly different from that of the recorded pattern A−, so that signals recorded in the patterns EP− and A− are correctly reproduced by the heads EP+ 39 and EP− 42, and the head A+ 38 and A− 41.

Figure 7B:
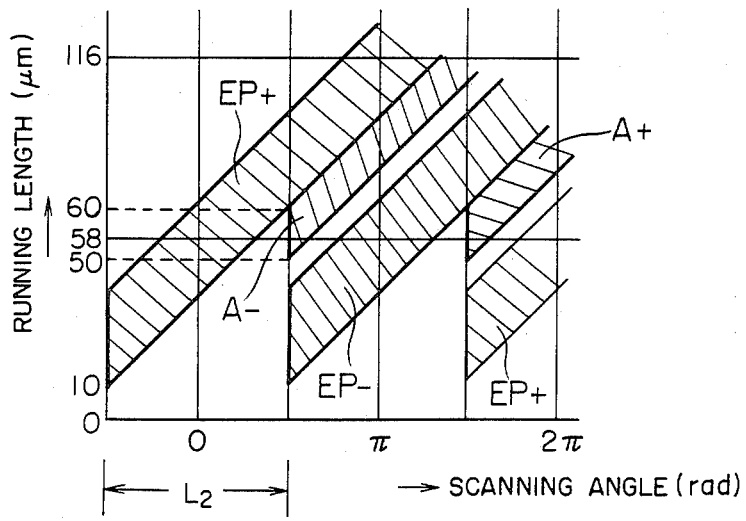

FIG. 7b shows record patterns EP+, EP−, A+, and A− which are formed on a tape by the magnetic heads EP+ 39, EP− 42, A+ 38, and A− 41, in the "two-channel" system. A running speed of the tape in this "two-channel" system is selected to be large. This tape running speed is selected, for example, to a value equal to that in the "SP" mode in the "color under" system. It s a matter of course that the distance $L_2$ is larger than the distance $L_1$. A recorded pattern EP− of a luminance signal formed by the magnetic head EP− 42 and a recorded pattern A− of a chrominance signal formed by the magnetic head A− 41 are disposed on the tape adjacently to each other without being superimposed one on the other. Further, a record pattern EP− of the luminance signal formed by the magnetic head EP+ 39 and a recorded pattern A+ of the chrominanc signal formed by the magnetic head A+ 38 are disposed on the tape adjacently to each other. Thus, a VTR in the "two-cannel" system is realized.

Figure 8:
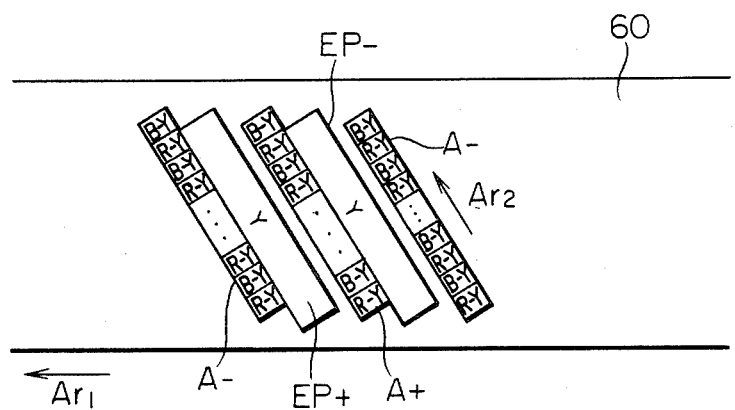
FIG. 8 is a typical diagram showing the patterns of FIG. 7b, formed on a magnetic tape.

FIG. 8 shows all the record patterns formed on tracks of a tape. In FIG. 8, a tape 60 runs in the direction of an arrow $Ar_1$, and, on the ther hand, the magnetic heads EP+ 39, EP− 42, A+ 38, and A− 41 scan the tape in the direction of an arrow of $Ar_2$. A luminance signal Y is recorded in the patterns EP+ and EP− and chrominance signals (R−Y) and (B−Y) are recorded in the patterns A+ and A−. Further, a sound signal is recorded in the patterns A+ and A− together with the chrominance signals. Although the patterns EP+ and A− are disposed adjacently to each other, the chrominance signal recorded in the pattern A− is reproduced later than the luminance signal recorded in the pattern EP+ by one field period.

The luminance signal and the chrominance signal are simultaneously recorded into and simultaneously reproduced from the patterns EP− and A− respectively. Therefore, it is preferable to make the patterns EP− and A− pair with each other.

Figure 7C:
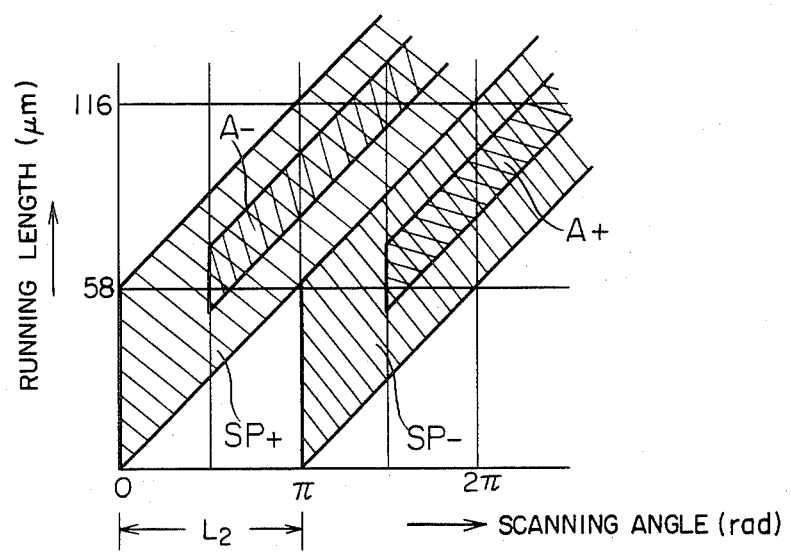

FIG. 7c shows respective record patterns formed by the magnetic heads SP+ 40, SP− 43, A+ 38, and A− 41 in a second mode, for example, in the "SP" mode, in the "color under" system. A video signal is recorded in the record patterns SP+ and SP−, and a sound signal is recorded in the record patterns A+ and A−. The record pattern A− is disposed so as to be superimposed on the record pattern SP+, and on the other hand, the record pattern A+ is disposed so as to be superimposed on the record pattern SP−. A running speed of a tape in FIG. 7c is selected to be a value equal to that in FIG. 7b. The respective azimuth angles $\theta_{32}$ and $\theta_{22}$ of the magnetic heads SP+ 40 and SP4l are reversed and therefore considerably different from each other, so that signals recorded in the record patterns SP+ and Aare correctly reproduced. Similarly to this, signals recorded in the record patterns SP and A+ are correctly reproduced.

The video signal is recorded in the pattern EP+ as shown in FIG. 7a later than the sound signal to be recorded in the record pattern A+ by a tape scanning angle of 2 (rad), that is, by a value corresponding to two fields.

The video signal is recorded in the record pattern SP+ as shown in FIG. 7c later than the sound signal to be recorded in the record pattern A− by a tape running angle of $\pi/2$ (rad), that is, by a value corresponding to ½ field.

In the array of the magnetic heads as shown in FIG. 5, if the magnetic heads SP+ 40 and SP− 43 are used for recording a video signal in the "SP" mode in the "VHS" system, the magnetic heads EP+ 39 and EP− 42 are used for recording a video signal in the "EP" mode of the same, and the magnetic heads A+ 38 and A− 41 are used for recording a frequency-modulated sound signal, those magnetic head are perfectly compatible with the "VHS" system. Further, it is possible to record/reproduce luminance and chrominance signals in the "two-channel" system by this array of magnetic heads.

As described above, according to the present invention, two pairs of magnetic heads are suitably disposed so that the video and sound signals in one mode in the "color under" system in the "two-channel mode" and, alternatively, the luminance and chrominance signals in the "two-channel" system can be selectively correctly recorded by merely changing the tape running speed.

Further, if necessary, also a sound signal can be correctly recorded together with the chrominance signal. Further, it is possible to correctly arrange and record the video and sound signals in the other mode in the "color under" system onto a tape by properly arranging a further pair of magnetic heads in addition to the two pairs of magnetic head described above.

What is claimed is:

1. A magnetic recording/reproducing apparatus of the helical scan type comprising:

an arrangement of pairs of rotary magnetic heads disposed circumferentially on a rotary body;

means for selecting one of a first recording system and a second recording system different from said first recording system so that it is possible to record/reproduce a video signal including luminance and chrominance information onto/from a plurality of tracks on a magnetic tape in the selected one of said first and second recording systems, whereby a color subcarrier quadrature modulated by said chrominance information is recorded onto a first track together with an FM carrier frequency-modulated by said luminance information at the same time in said first recording system, while a first carrier frequency-modulated by said luminance information and a second carrier frequency-modulated by said chrominance information are recorded onto a second track and a third track adjacent to said second track respectively;

said arrangement of pairs of rotary magnetic heads including;

a first pair of rotary magnetic heads constituted by a first and a second magnetic heads circumferentially separated from each other by 180 degrees ($\pi$ rad) on said rotary body, said first pair of rotary magnetic heads recording said FM carrier and said color subcarrier onto said first track in a first mode where said magnetic tape runs at a first tape speed in said first recording system, and said first pair of rotary magnetic heads recording said first carrier onto said second track at a second tape speed different from said first tape speed in said second system; and a second pair of rotary magnetic heads constituted by a third and a fourth magnetic heads circumferentially separated from each other by 180 degrees ($\pi$ rad) on said rotary body, said third magnetic head being arranged adjacently to said first magnetic head, said fourth magnetic head being arranged adjacently to said second magnetic head, each of said third and fourth heads being disposed at a position different in height from that of each of said first and second magnetic heads, said second pair of rotary magnetic heads being arranged to record said second carrier onto said third track at said second tape speed in said second system.

2. A magnetic recording/reproducing apparatus according to claim 1, in which said second pair of rotary magnetic heads are arranged to record a sound carrier modulated by a sound signal at said first speed in said first mode onto said first track to which said FM carrier and said color subcarrrier are to be recorded by said first pair of rotary magnetic heads.

3. A magnetic recording/reproducing apparatus according to claim 2, in which respective azimuth angles of said first pair of rotary magnetic heads and said second pair of rotary magnetic heads are different from each other.

4. A magnetic recording/reproducing apparatus according to claim 2, in which said sound carrier is frequency-modulated.

5. A magnetic recording/reproducing apparatus of the helical scan type comprising:

an arrangement of pairs of rotary magnetic heads disposed circumferentially on a rotary body;

means for selecting one of a first recording system and a second recording system different from said first recording system so that it is possible to record/reproduce a video signal including luminance and chrominance information onto/from a plurality of tracks on a magnetic tape in the selected one of said first and second recording systems, whereby a color subcarrier quadrature modulated by said chrominance information is recorded onto a first track together with an FM carrier frequency-modulated by said luminance information at the same time in said first recording system, while a first carrier frequency-modulated by said luminance information and a second carrier frequency-modulated by said chrominance information are recorded onto a second track and a third track adjacent to said second track respectively;

said arrangement of pairs of rotary magnetic heads including;

a first pair of rotary magnetic heads constituted by a first and a second magnetic heads circumferentially separated from each other by 180 degrees ($\pi$ rad) on said rotary body, said first pair of rotary magnetic heads recording said FM carrier and said color subcarrier onto said first track in a first mode where said magnetic tape runs at a first tape speed in said first recording system, and said first pair of rotary magnetic heads recording said first carrier onto said second track at a second tape speed different from said first tape speed in said second system;

a second pair of rotary magnetic heads constituted by a third and a fourth magnetic heads circumferentially separated from each other by 180 degrees ($\pi$ rad) on said rotary body, said third magnetic head being arranged adjacently to said first magnetic head, said fourth magnetic head being arranged adjacently to said second magnetic head, each of said third and fourth heads being disposed at a position different in height from that of each of said first and second magnetic heads, said second pair of rotary magnetic heads being arranged to record said second carrier onto said third track at said second tape speed in said second system; and a third pair of rotary magnetic heads constituted by a fifth and a sixth magnetic heads circumferentially separated from each other by 180 degrees ($\pi$ rad) on said rotary body and circumferentially separated from said first pair of rotary magnetic heads by 90 degrees ($\pi/2$ rad), said third pair of rotary magnetic heads being arranged at said second tape speed in said second recording system to record said FM carrier and said color subcarrier onto a fourth track in a second mode different from said first mode in said first recording system.

6. A magnetic recording/reproducing apparatus according to claim 5, in which said second pair of rotary magnetic heads are arranged to record a sound carrier modulated by a sound signal in said second mode onto said fourth track to which said FM carrier and said color subcarrier are to be recorded by said third pair of rotary magnetic heads.

7. A magnetic recording/reproducing apparatus according to claim 5, in which said third pair of rotary magnetic heads are disposed at a height different from that of said first pair of rotary magnetic heads.

8. A magnetic recording/reproducing apparatus according to claim 5, in which said third pair of rotary magnetic heads are arranged to have a track width of about 50 μm, said second pair of rotary magnetic heads are arranged to have a track width of about 20 μm, said third pair of rotary magnetic heads are arranged to have a track width of about 58 μm, and said first pair of rotary magneti heads are disposed at a height different by about 35 μm from that of said second pair of rotary magnetic heads.

9. A magnetic recording/reproducing apparatus according to claim 6, in which respective azimuth angles of said first pair of rotary magnetic heads and said second pair of rotary magnetic heads are different from each other, and respective azimuth angles of said second pair of rotary magnetic heads and said third pair of rotary magnetic heads are different from each other.

10. A magnetic recording/reproducing apparatus according to claim 7, in which said first pair of rotary magnetic heads are disposed at a height different by about 4 μm from that of said third pair of rotary magnetic heads.

* * * * *